United States Patent [19]
Grendelman et al.

[11] 4,217,935
[45] Aug. 19, 1980

[54] FIBER REINFORCED PLASTIC PIPE PART

[75] Inventors: Mannes Grendelman; Mattheus J. Poiesz; Leo A. A. van der Kemp, all of Hardenberg, Netherlands

[73] Assignee: Wavin B.V., Zwolle, Netherlands

[21] Appl. No.: 891,527

[22] Filed: Mar. 30, 1978

[30] Foreign Application Priority Data

Mar. 31, 1977 [NL] Netherlands ............... 7703545
Mar. 31, 1977 [NL] Netherlands ............... 7703546

[51] Int. Cl.² .................................... F16L 9/12
[52] U.S. Cl. ......................... 138/109; 138/144; 138/153; 138/174
[58] Field of Search ........... 138/109, 153, 172, 137, 138/141, 144, 174

[56] References Cited

U.S. PATENT DOCUMENTS

| 3,200,023 | 8/1965 | Cilker | 138/109 |
| 3,468,346 | 9/1969 | Onifer | 138/109 |
| 3,532,132 | 10/1970 | Rubenstein | 138/172 |
| 3,537,484 | 11/1970 | McLarty | 138/109 |
| 3,920,049 | 11/1975 | Lippert et al. | 138/109 |

Primary Examiner—Lenard A. Footland
Attorney, Agent, or Firm—Barry G. Magidoff

[57] ABSTRACT

A method of manufacturing a fiber reinforced plastic pipe part, comprising a first wall part and a wall part adjoining the latter through an inner rounded corner transition having a radius of curvature of less than 5 mm, preferably 0,5 to 3 mm.

4 Claims, 4 Drawing Figures

FIBER REINFORCED PLASTIC PIPE PART

BACKGROUND OF THE INVENTION

The invention relates to a fiber reinforced plastic pipe part of a thermosetting resin, comprising a first wall part and another wall part adjoining the latter through a corner transition.

Glass fiber reinforced plastic pipe parts of a thermosetting resin are generally known in various embodiments. They all comprise a corner transition between a first wall part and a wall part adjoining the latter. When a T-shaped pipe piece is used said transition is the transition between the inner wall of a first pipe part and the inner wall of a branch pipe connected therewith. In spigot- and socket joints connections this corner transition is the transition between the inner wall of the widened part of the socket and the adjoining inner wall of a pipe part connected with the socket or an impact absorbing edge within said socket.

In flanges said corner transition is a transition between the flat wall of the flange and the inner side of the plastic pipe comprising the flange.

All these plastic pipe parts have the drawback that the angular transitions are inclined to get damaged when a mechanical treatment is performed upon them, which may lead to breaking off of small pieces of cured thermosetting plastics, which easily may involve a corrosion of the relative pipe by penetration into the plastic of fluids transferred through the pipes.

SUMMARY OF THE INVENTION

The invention now aims to provide a fiber reinforced plastic pipe part of the aforementioned type, which no longer has said drawbacks.

This is achieved in accordance with the invention, in that the corner transition is rounded. Preferably said rounding has a radius of curvature of less than 5 mm.

Even when heavy mechanical loads are used the phenomenon of breaking off of plastic parts or particles will no longer occur, when such a type of rounded corner transition is applied, so that fiber reinforced plastic pipe parts of that type can be advantageously used, which is of great importance in practice.

The rounded corner transition preferably has a radius of curvature of 0.5 to 3 mm, preferably 2 mm.

Upon or in the vicinity of the inner surface of the first wall part, there is expediently a non-woven layer, enclosed within the thermosetting resin, particularly a C-glass (fiber) non-woven layer, which layer merges whether continuously or discontinuously, into a non-woven layer of the projecting end face.

The term "C"-glass is a term defining a type of fibrous glass filaments used as reinforcements in resin moldings, formed of low-soda glass. "C"-glass is known to have good durability and chemical resistance. It is known to be resistant to most strong acids. For further information see ENCYCLOPEDIA OF BASIC MATERIALS FOR PLASTICS, H. R. SIMONDS and J. M. CHURCH (Eds), Rineholt Publishing Corp., 1967, pages 252–253, and the publication of the International Standards Organization (ISO No. 2078, Second Edition 1976).

Preferably the first wall part of a pipe and the other wall part consisting of a flange, comprise non-woven layers, which do not contact each other, whereby the non-woven layer in the other wall part extends to at least the extension of the non-woven layer in the first wall part.

When a flange is used the separate non-woven layers in the first wall part and in the other wall part expediently adjoin each other.

SURVEY OF THE DRAWINGS

DESCRIPTION OF A PREFERRED EMBODIMENT

Figure 1:
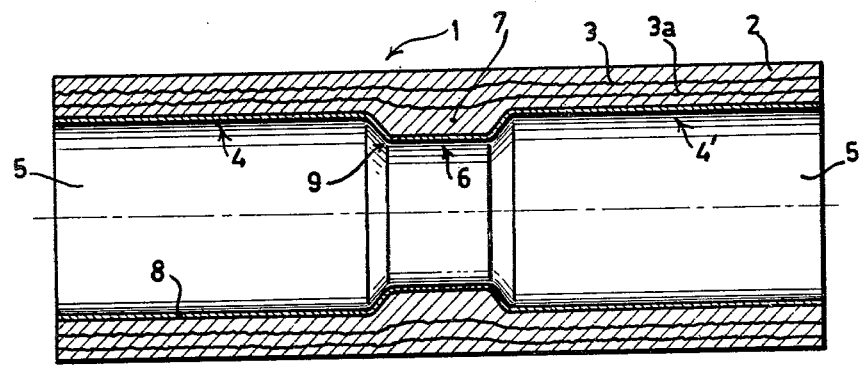
FIG. 1 shows a cross section of a double socket according to the invention.

FIG. 1 shows a plastic socket 1 comprising a tubular resin body 2, presently comprising two reinforcement layers 3 and 3a (liners), but it will be obvious that a plurality of layers or liners can be used.

The socket comprises a first cylindrical wall part 4 of the socket-shaped widening 5, designed for receiving a male pipe part. Adjoining said first cylindrical wall part 4 there is another cylindrical wall part 6 within the socket forming an edge 7, which wall part 6 merges into a first cylindrical wall part 4' of the other side of the double socket 1.

In the vicinity of a first cylindrical wall part 4, 4' and. the other wall part 6, there is a C-glass fiber layer, immersed into thermosetting resin, and is referenced 8.

Since breaking off of pieces of material may occur at the location of the corner transition 9, said transition is expediently rounded and has a radius of curvature of 2 mm.

When such a radius of curvature is used a fiber reinforced plastic socket is obtained which can meet all practical requirements and whereby no damage of breaking off of plastic pieces will occur at the location of the corner transition 9.

Figure 2:
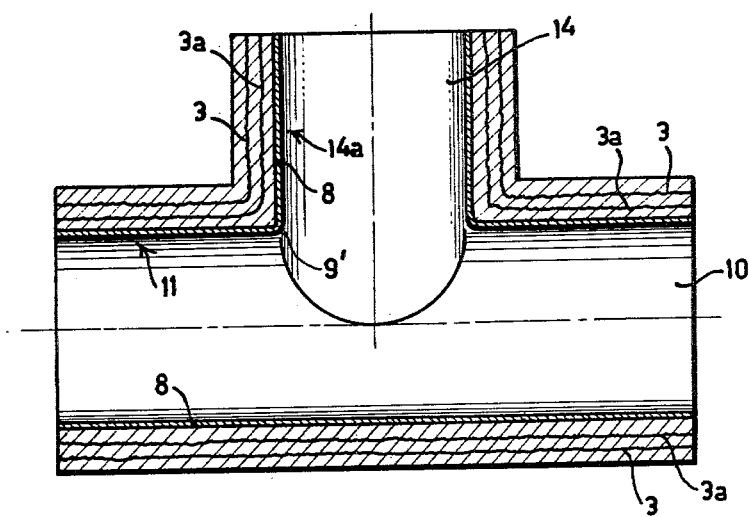
FIG. 2 shows a cross section of a T-shaped piece, according to the invention.

FIG. 2 shows a first pipe part 10 with an inner wall 11 upon which pipe part a branch pipe 14 is mounted having an inner wall.

In the vicinity of the inner wall of the first wall part 11 and the inner wall of the other wall part 14a, there is a C-glass fiber layer 8, which is embedded with a thermosetting resin, preferably a polyester resin. Epoxy resin can be used as well, however.

The wall of the first pipe part 10 comprises reinforcement filaments layers or liners 3 and 3a which extend into the wall of the branch part 12.

So as to avoid breaking off of any plastic material at the location of the corner transition 9' between the inner wall 11 of pipe part 10 and the inner wall of the branch pipe part 14, said corner transition 9' is rounded and has a radius of curvature of 2 mm. Good results are also produced by a radius of curvature of 3 mm.

It has been found however, that a radius of curvature of 1 to 3 mm is to be preferred, and more particularly a radius of curvature of 2 mm.

Figure 3:
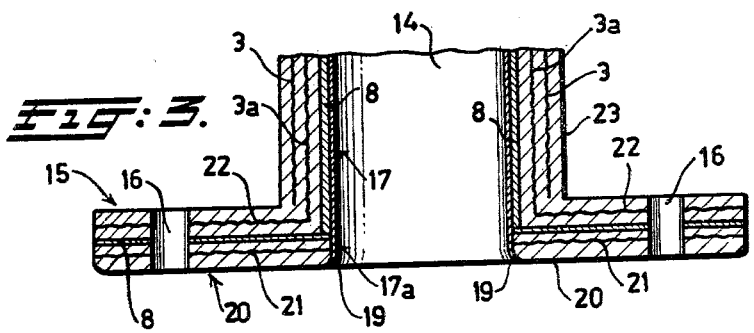
FIG. 3 shows a cross section of a flange according to the invention.

FIG. 3 shows a fiber reinforced plastic pipe part 14 having a flange 15 with bores 16.

The pipe wall 17 of the first wall part is provided with an internal non-woven layer 8 which consists expediently of C-glass fibers, embedded within a cured epoxy resin.

Moreover, the plastic pipe part comprises a plurality of reinforcement layers, or liners 3, 3a consisting of glass filaments, which are embedded within epoxy resin. Said glass filaments are crosslike and helically wound to layers, according to a system for winding filaments.

Owing to the presence of the internal glass fiber layer 8, no agressive medium can possibly penetrate into the inner wall of said fiber reinforced plastic pipe 14, which would involve a corrosion of said pipe and a collapse of same.

So as to prevent any breaking off of plastic resin particles at the location of the transition 19 between the inner wall part 17a with a flange of the pipe, and the outer wall 20 of the flange, the transition is rounded and has a radius of curvature ranging from 1 to 3 mm, and preferably of 2 mm. We now use a radius of curvature of 2 mm.

The flange body comprises expediently a non-woven layer or a woven layer 21 which extends to at least the region in between the extension of the fiber reinforced layer 8 in the pipe part 14 and appropriately adjoins said layer.

The flange 15 can further comprise another non-woven or a woven layer 22 which ends remote from the inner side of the pipe with flange but which extends to beyond the extension of the outside 23 of the pipe 14.

As can be seen, the layer 3 ends more remote from the outer face 20 than the layer or liner 3a, which also counts for the now-woven layer 8, which further extends toward the outer face 20 of the flange 15 than the layer or liner 3a.

The layers 22, 8 and 21 always extend further toward the inner wall of the pipe part 14 with matching flange.

Figure 4:
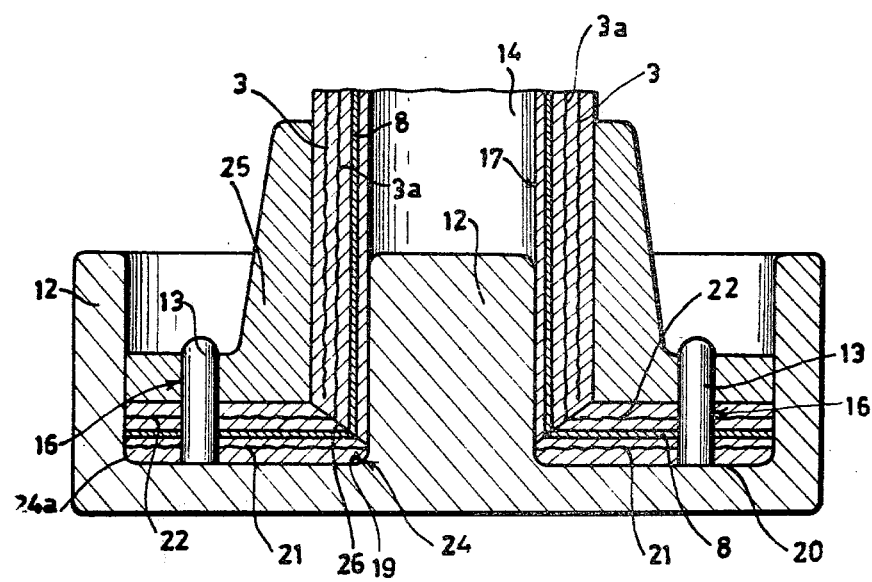
FIG. 4 shows a cross-section of a mold for forming a flange in accordance with FIG. 3, including a flange in the process of being manufactured.

In order to produce a fiber reinforced plastic pipe having a flange according to the invention, one operates as follows, referring to FIG. 4:

A glass fiber layer 21 immersed into a thermosetting resin is positioned in a mould 12, and subsequently coated with a C-glass fiber layer 8, likewise immersed into a thermosetting resin, which layer will form the first flange fiber layer.

Thereafter a reinforced plastic pipe 14 having a chamfer 26 at its end, will be pressed upon the internal flange fiber layer, so that a good connection or joint is produced between the internal pipe fiber layer 8 of C-glass fibers and a first flange fiber layer 8.

Said layer can still be coated with another glass fiber layer or a woven layer 21, 22, which are embedded within a plastic thermosetting resin mass, preferably an expoxy resin mass.

When the flange is formed, the openings 16 are also formed by means of pins 13, so that later on bolts can be applied for connecting plastic pipes having a flange.

The layers 21 and 22 can also be formed of glass mats, filaments or woven materials.

The mould 12 comprises at its inside a rounding 24 for the formation of a pipe rounding 19. The external side of the flange is also provided with an identical rounding 24a. Before curing the flange, the outer mould part 25 is applied.

It goes without saying that a plastic pipe having a flange to be applied in the aforementioned embodiment, can easily be changed by the surface of another pipe part, so that a T-piece is obtained.

What is claimed is:

1. A pipe piece formed of a fiber-reinforced plastic thermosetting resin, the pipe piece comprising a first pipe part having a first inner wall surface comprising a primary non-woven layer of C-glass fiber extending parallel to the longitudinal axis of the first pipe part, and a second adjoining pipe part being a flange having a second wall surface, the first and second wall surfaces extending transversely to each other and being connected through a rounded transition corner, the corner having a radius of curvature of from 0.5 mm. to 3 mm; and wherein said first pipe part further comprises a plurality of secondary layers of helically overlapping glass filaments embedded in thermosetting resin, said second pipe part comprising a plurality of secondary layers of glass filaments embedded in thermosetting resin.

2. The pipe piece of claim 1 extending transverse to the axis of the first pipe part, the two non-woven glass fiber layers merging.

3. The plastic pipe piece of claim 1, wherein the first and second non-woven layers are adjoining.

4. The pipe piece of claim 1, further comprising a plurality of reinforcement layers of crosslike and helically wound glass filaments, embedded within the resin, radially outwardly from the primary layer of non-woven C-glass fibers, the reinforcement layers being further removed from the second wall surface than the primary layer of non-woven C-glass fibers.

* * * * *

UNITED STATES PATENT AND TRADEMARK OFFICE
CERTIFICATE OF CORRECTION

PATENT NO. : 4,217,935
DATED : August 19, 1980
INVENTOR(S) : Mannes Grendelman, et al It is certified that error appears in the above-identified patent and that said Letters Patent are hereby corrected as shown below:

Column 4, line 36 (Claim 2, line 1) - insert after "Claim 1" the following: --comprising a second non-woven layer of C-glass fiber embedded within the thermosetting resin forming the second wall surface and--.

Signed and Sealed this

Eighteenth Day of November 1980

[SEAL]

Attest:

SIDNEY A. DIAMOND

Attesting Officer

Commissioner of Patents and Trademarks